United States Patent
Seeberg (10) Patent No.: US 9,182,307 B2
(45) Date of Patent: Nov. 10, 2015

(54) SEPARATING MEMBRANE FOR PRESSURE SENSOR

(76) Inventor: Bjørn Erik Seeberg, Oslo (NO)

(*) Notice: Subject to any disclaimer, the term of this patent is extended or adjusted under 35 U.S.C. 154(b) by 676 days.

(21) Appl. No.: 13/498,292

(22) PCT Filed: Oct. 19, 2010

(86) PCT No.: PCT/NO2010/000367
§ 371 (c)(1),
(2), (4) Date: Jun. 12, 2012

(87) PCT Pub. No.: WO2011/049459
PCT Pub. Date: Apr. 28, 2011

(65) Prior Publication Data
US 2012/0247215 A1 Oct. 4, 2012

(30) Foreign Application Priority Data
Oct. 19, 2009 (NO) .................................. 20093171

(51) Int. Cl.
*G01L 7/00* (2006.01)
*G01L 19/00* (2006.01)

(52) U.S. Cl.
CPC ....... *G01L 19/0046* (2013.01); *Y10T 29/49826* (2015.01)

(58) Field of Classification Search
CPC ..................................................... G01L 7/082
See application file for complete search history.

(56) References Cited

U.S. PATENT DOCUMENTS

| 2,877,799 | A |   | 3/1959 | Hildenbrandt |       |
|-----------|---|---|--------|--------------|-------|
| 5,095,755 | A | * | 3/1992 | Peterson ......................... | 73/706 |
| 2006/0048580 | A1 | * | 3/2006 | Vogler ............................ | 73/706 |

FOREIGN PATENT DOCUMENTS

| WO | WO-9208116 A1    | 5/1992  |
|----|------------------|---------|
| WO | WO-2008150176 A1 | 12/2008 |
| WO | WO-2009067016 A1 | 5/2009  |

OTHER PUBLICATIONS

International Search Report for PCT/NO2010/000367 dated Jan. 14, 2011.
International Preliminary Report on Patentability for PCT/NO2010/000367 dated Jan. 11, 2012.

* cited by examiner

*Primary Examiner* — Lisa Caputo
*Assistant Examiner* — Brandi N Hopkins
(74) *Attorney, Agent, or Firm* — Cooper Legal Group, LLC (57) ABSTRACT

A separating membrane for use particularly in pressure sensors, for separating between a process fluid and a pressure-transferring hydraulic oil, is described. The separating membrane is in the form of a thin foil covering an opening into a volume containing the oil, with the foil being fastened to the edges of the opening, and is characterized in that the separating membrane is fastened at the edges of the opening in such a manner that it, in at least one region of its area, exhibits a transition from a concave to convex bulging, whereby the membrane is able to accommodate a volume change of the oil through a non-energy requiring translation of the transition(s). Also described are a method of manufacturing the separating membrane as well as a pressure sensor comprising the separating membrane.

23 Claims, 4 Drawing Sheets

SEPARATING MEMBRANE FOR PRESSURE SENSOR

INTRODUCTION

The present invention relates to a separating membrane for use especially in pressure sensors. In particular, the separating membrane is used for separating between a process fluid and a pressure-transferring hydraulic oil.

BACKGROUND

Measuring pressures in an application with large temperature variations presents great challenges to the measurement equipment and the dimensioning thereof. Moreover, the taking of such pressure measurements is often desired in a difficult environment, such as in connection with subsea oil installations and processing facilities, for example. Under such conditions it is common to effectuate the measurement remotely from the location where the measurement is desired. Often, a transfer medium in the form of hydraulic oil located in long lines is used. These long lines extend to a pressure gauge positioned at a distance from the desired measurement location. Even though such lines are thin, the total volume of oil within these long lines is large. It is common to use large, thin membranes (diameter larger than 50 mm) of a corrugated metal for separating the process fluid to be measured from the pressure-transferring hydraulic oil transferring the pressure to the sensor.

However, it is usually desired to have the membranes as small as possible, so as to save costs, weight, and size. In addition, the hydraulic forces are significantly smaller if the diameter of the pressure connection is small. The problem of having small dimensions (less than 20 mm), however, is that the membrane becomes too rigid and causes measuring errors which are not stable over time. This is particularly a problem when measuring pressure in the presence of large pressure and temperature differences, such as in oil installations and processing facilities, for example.

SUMMARY OF THE INVENTION

The present invention provides a solution to the problem indicated above.

In a first aspect, the invention provides a separating membrane for use especially in pressure sensors for separating between a process fluid and a pressure-transferring fluid, in the form of a thin foil covering an opening into a volume containing the pressure-transferring fluid, wherein the foil is attached to the edges of the opening, with the separating membrane being attached to the edges of the opening in such a manner that, in at least one region of the area thereof, it exhibits a transition from a concave to a convex bulging, whereby the membrane is able to absorb/accommodate a volume change of the pressure-transferring fluid through a non-energy requiring translation of the transition(s).

The separating membrane may be supplied with a material stress. In one embodiment, the separating membrane, like the opening, may have a substantially rectangular shape and the bulging may comprise a ridge extending parallel to the long sides of the rectangle, whereby the non-energy requiring translation of the transition(s) is/are in a direction parallel to the long sides of the rectangle.

In another embodiment, the separating membrane, in two sections of the area thereof, may exhibit a transition from a concave to a convex bulging.

In a further embodiment, the separating membrane, like the opening, may be shaped substantially as a ring, with the bulging comprising a ridge extending parallel to a tangent of a circumference of the ring and the non-energy requiring translation of the transition(s) occurring in a direction parallel to said tangent.

The pressure-transferring fluid may be hydraulic oil.

In a second aspect, the invention provides a method of manufacturing a separating membrane for use especially in pressure sensors, for separating between a process fluid and a pressure-transferring fluid, in the form of a thin foil covering an opening into a volume containing the pressure-transferring fluid, and wherein the foil is fixed to the edges of the opening, the method being characterized in shaping the separating membrane and the opening in substantially corresponding geometrical shapes, but with the separating membrane being somewhat larger so that when the separating membrane is fastened to the edges of the opening, a given arcuate shape is formed, and by providing a material stress to the separating membrane for providing, in at least one section of the area of the separating membrane, a transition from a concave to a convex bulging, whereby the separating membrane is able to absorb a volume change of the pressure-transferring fluid through a non-energy requiring translation of the transition(s).

In one embodiment, the opening and separating membrane may be given substantially rectangular shapes, with the method further comprising: bending the separating membrane to a convex arcuate shape having a longitudinal ridge extending parallel to the long sides of the rectangle, attaching the long sides of the separating membrane to the long edges of the opening, attaching the one short, convex side of the separating membrane to the one short edge of the opening having a corresponding convex arcuate shape, depressing the other short side of the separating membrane to a concave shape, and attaching the other short side of the separating membrane to the other short side of the opening having a corresponding concave arcuate shape.

In another embodiment, the opening and separating membrane may be given substantially rectangular shapes, with the method further comprising: bending the separating membrane to a concave arcuate shape having a longitudinal valley parallel to the long sides of the rectangle, fastening the long sides of the separating membrane to the long edges of the opening and the short sides of the separating membrane to the short edges of the opening, with the short edges of the opening being formed with a concave arcuate shape complementary to the concave arcuate shape of the short concave sides of the separating membrane.

In a further embodiment, the opening and separating membrane may have circular geometrical shapes, with the method further comprising: bending the separating membrane to a convex arcuate shape having a ridge parallel to a tangent of a circumference of the separating membrane, fastening inner circular and outer circular edges of the separating membrane to corresponding inner and outer circular edges of the opening, radially fastening the separating membrane at a number of places at which the separating membrane, in the convex arcuate configuration, rests naturally on a corresponding convex arcuate shape of the circular opening, to form a number of radial end surfaces in the separating membrane limiting the non-energy requiring translation of the transition(s).

In a still further embodiment, the opening and separating membrane may have circular geometrical shapes, with the method further comprising: bending the separating membrane to a concave arcuate shape having a valley parallel to a tangent to a circumference of the separating membrane, fastening inner circular and outer circular edges of the separating membrane to corresponding inner and outer circular edges of the opening. The separating membrane may be radially fastened where the separating membrane, in the concave arcuate configuration, is naturally seated against a corresponding concave arcuate shape in the circular opening, to form a radial end surface in the separating membrane limiting the non-energy requiring translation of the transition(s).

The pressure-transferring fluid may be introduced into the volume beneath the separating membrane until the volume is at least half full. In other embodiments, the pressure-transferring fluid may be introduced into the volume beneath the separating membrane until the separating membrane, in at least one region of the area thereof, exhibits a transition from a concave to a convex bulging. Providing a material stress in the separating membrane may include performing pressing operations on the separating membrane. Providing material stress may include the use of a clamping tool. The membrane may be fastened by way of welding. The pressure-transferring medium in the form of hydraulic oil may be supplied in such an amount that a remaining portion of the volume containing the oil is non-zero.

In a third aspect, the invention provides a pressure sensor comprising: a volume containing a pressure-transferring fluid for transferring a processing pressure to be measured from a process fluid to a gauge for sensing the pressure, a separating membrane in the form of a thin foil covering an opening into the volume containing the pressure-transferring fluid, with the foil being fastened to the edges of the opening, characterized in that the separating membrane is fastened to the edges of the opening in such a manner that it, in at least one section of the area thereof, exhibits a transition from a concave to a convex bulging, whereby the membrane is able to absorb a volume change of the pressure-transferring fluid through a non-energy requiring translation of the transition(s).

The sensor may include a membrane seat which defines the opening and is shaped so as to be complementary with the arcuate shape of the separating membrane at least at fastening the separating membrane. The pressure-transferring fluid may be hydraulic oil. The separating membrane may be provided with a material stress.

The separating membrane of the invention has one or more bi-stable transition zones which may travel as a wave along the membrane. The membrane is given an inherent energy that is stored in the separating membrane for a very long time. The design of the membrane results in that it does not absorb any energy from the pressure field to be measured, as the pressure change is absorbed by the wave motion of the membrane with no loss of energy. This means that the pressure drop across the membrane is zero. The pressures are equal on the outside and inside of the membrane, ensuring that a correct measurement of the desired pressure is obtained.

Pressure sensors employing the separating membrane of the invention will be able to operate over a wide range of pressures and temperatures, such as temperatures from −70° C. to +200° C. and pressures from 0 to 2000 bar, for example. Ideally, the fluid should be fully incompressible and not expand with the temperature. However, such a fluid does not exist. The separating membrane of the present invention compensates for such non-ideal behavior by absorbing the associated movement of the fluid without the pressure field to be measured loses energy to the membrane. The separating membrane of the invention has a long operational life with no need for replacement during the lifetime of the sensor. For oil installations, the typical operating lifetime is 25 years.

BRIEF DESCRIPTION OF THE DRAWINGS

In the following, embodiments of the invention will be explained in more detail with reference to the accompanying drawings, in which.

DETAILED DESCRIPTION

Structure

Figure 1:
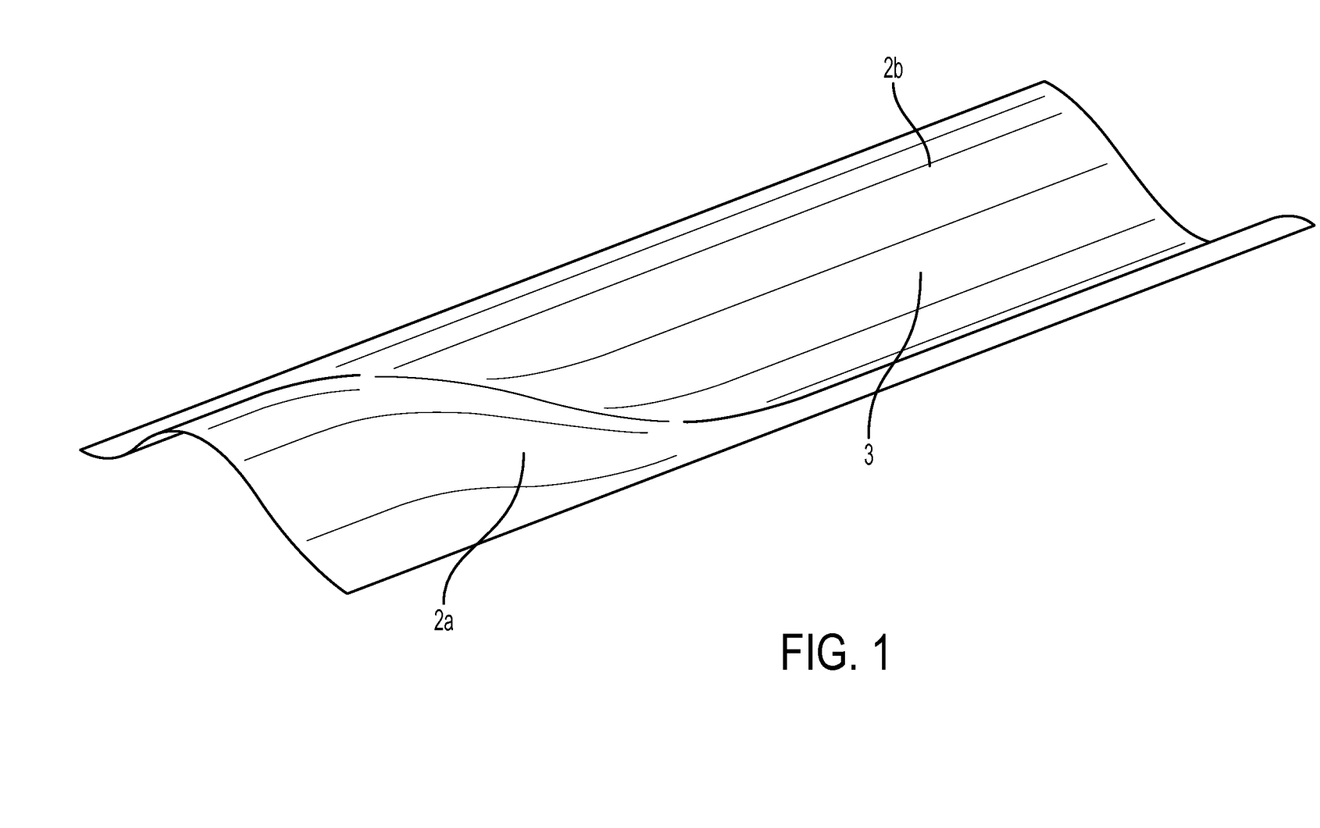
FIG. 1 shows a substantially rectangular separating membrane according to an embodiment of the invention, but fastening is not shown.

FIG. 1 shows a model of a separating membrane 1 in the form of a substantially rectangular foil. The foil of FIG. 1 is shown in a suspended configuration, but with the actual fastening of the membrane is not shown. In a relaxed state, the foil of FIG. 1 is rectangular, but when suspended as a separating membrane, it has a curved shape with a ridge extending parallel to a longitudinal axis of the foil as shown in FIG. 1. The membrane of FIG. 1 is suspended in such a way that it exhibits, in the left half thereof, a bulging 2a having a convex shape extending substantially parallel to the long sides of the rectangle, whereas in the right half thereof, it exhibits a bulging 2b having a concave shape also extending substantially parallel to the long sides of the rectangle. Another way to describe this is that the bulges have ridges extending parallel to the long sides of the rectangle. A transition zone 3 between the concave and the convex areas of the foil is shown with a dark marking in FIG. 1. The end surfaces of the separating membrane of FIG. 1 comprise a convex 2a and a concave shape 2b, respectively. However, even though the separating membrane is shown in FIG. 1 having right and left areas being concave and convex, respectively, the separating membrane could also be formed with a convex right area and a concave left area. The convex and concave areas of the foil form zones of elastic compression. This will be explained in more detail later.

The separating membrane of FIG. 1 is arranged over an opening in a body leading into a volume containing a pressure-transferring fluid. This pressure-transferring fluid may be hydraulic oil. In order for the membrane to be able to assume a bulging shape when fastened across the opening as explained above, the opening has an outer shape that is complementary to the outer geometrical shape of the separating membrane in the suspended state, but has a smaller size/outer dimension than the foil in the relaxed state. In other words, in its relaxed state, the separating membrane is larger than the opening. Depending on the geometrical shape, the opening may be delimited by two parallel lines, possibly having two concentric arcs in the same plane as the side edges. End sections may be defined as two curves similar to the one assumed by the foil in the suspended configuration. The two curves may bend down, or one curve may bend up and the other curve may bend down.

The opening may be defined by a membrane seat (not shown) having a substantially concave shape. In such an embodiment, the separating membrane will be able to be completely seated against the membrane seat. The membrane seat will be accurately machined to fit the final shape of the separating membrane in the suspended state. In operation, the separating membrane of a pressure sensor may be exposed to pressures of at least 2000 bar. With a correct design of the membrane seat, the separating membrane will be able to resist this pressure through its ability to be seated against the seat.

The membrane seat will be adapted to the individual embodiments of the separating membrane also when it comes to transition zones. This applies particularly to the region in which the membrane is fixed to the outer opening of the seat. The opening of the membrane seat is shaped so as to fit the arc form of the separating membrane. As shown in FIG. 1, one end surface in the case of a separating membrane having one transition zone will have one convex short side and one concave short side. The membrane seat opening then has corresponding complementary convex and concave shapes to which these end surfaces may be fastened. The actual manufacturing of the membrane will be explained below, and these aspects will then be detailed.

Figure 2:
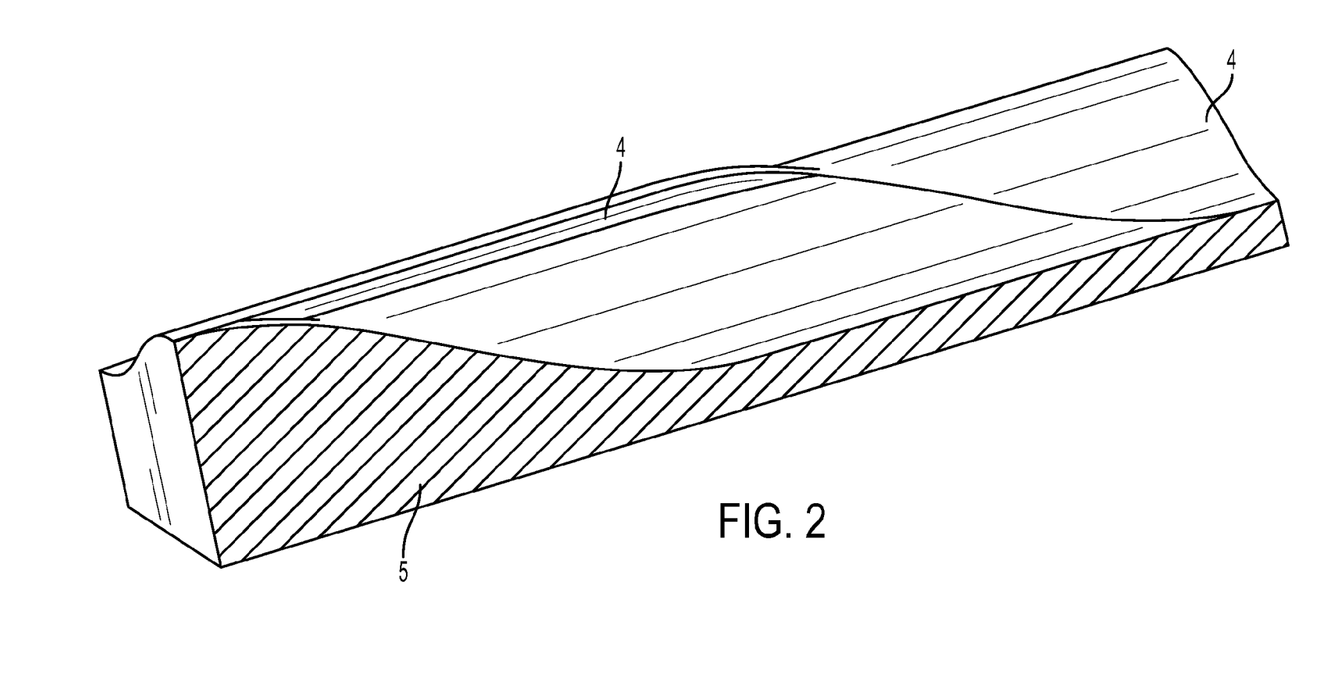
FIG. 2 shows a cut through a part of a substantially rectangular separating membrane in a fastened position according to an embodiment of the invention.

FIG. 2 shows the right, convex portion and parts of the transition zone of the separating membrane of FIG. 1. In FIG. 2, however, parts of the separating membrane of FIG. 1 have been removed in order to show the attachment of the membrane. The separating membrane is attached to an opening leading into a volume containing hydraulic oil 5. The hydraulic oil serves as a transfer medium into the pressure sensor (not shown). The pressure sensor is located behind the separating membrane in communication with the volume containing the pressure-transferring fluid. An exemplary design of a separating membrane having a conduit into a pressure sensor will be described below.

Each of the sides of the separating membrane of FIG. 2 is sealingly fastened to the opening through welding of the sides onto the opening in order to define an outer boundary for the inner volume. This welding zone 4 is shown at the right short end and at the one long side as shown from the inside in FIG. 2. The weld forms a pressure and fluid tight termination zone along the edges of the membrane 1 where there cannot be any transition zone 3 between the concave 2b and the convex 2a bulging of the separating membrane/foil. The transition zone 3 is located well within this welding zone. The transition zone 3 between the concave 2b and convex 2a bulging, as explained above, may travel as a wave in a longitudinal direction of the separating membrane with the direction of movement of the wave front being parallel to the long sides of the separating membrane. This wave motion is a non-energy requiring translation of the transition(s) in a direction parallel to the long sides of the rectangle.

The non-energy requiring translation can be explained as follows. The material of the membrane is manufactures in such a manner that at any time the material is subject to inherent mechanical stresses. The existence of such stresses means that (potential) energy is stored in the material. As explained above, the transition zone may move to any possible position within the separating membrane, meaning that the separating membrane has different states of stress in the different positions. Each of these different states of stress, however, has the same amount of potential energy. The transition zone may therefore move from one position in the membrane to another without the need for the material/separating membrane to receive energy from or transfer energy to the surroundings. This is similar to how waves propagate. The displacement of the transition zone reuses the potential energy that has already been stored during manufacture of the separating membrane to obtain the new stress state. Ordinary membranes without such inherent material stresses as in the present invention have a different potential energy for each membrane position. With ordinary membranes, therefore, this energy is taken from the pressure as volume (V) times pressure drop (dp); Vdp. This pressure drop contributes to the pressure measurement error when ordinary membranes are used.

Figure 3:
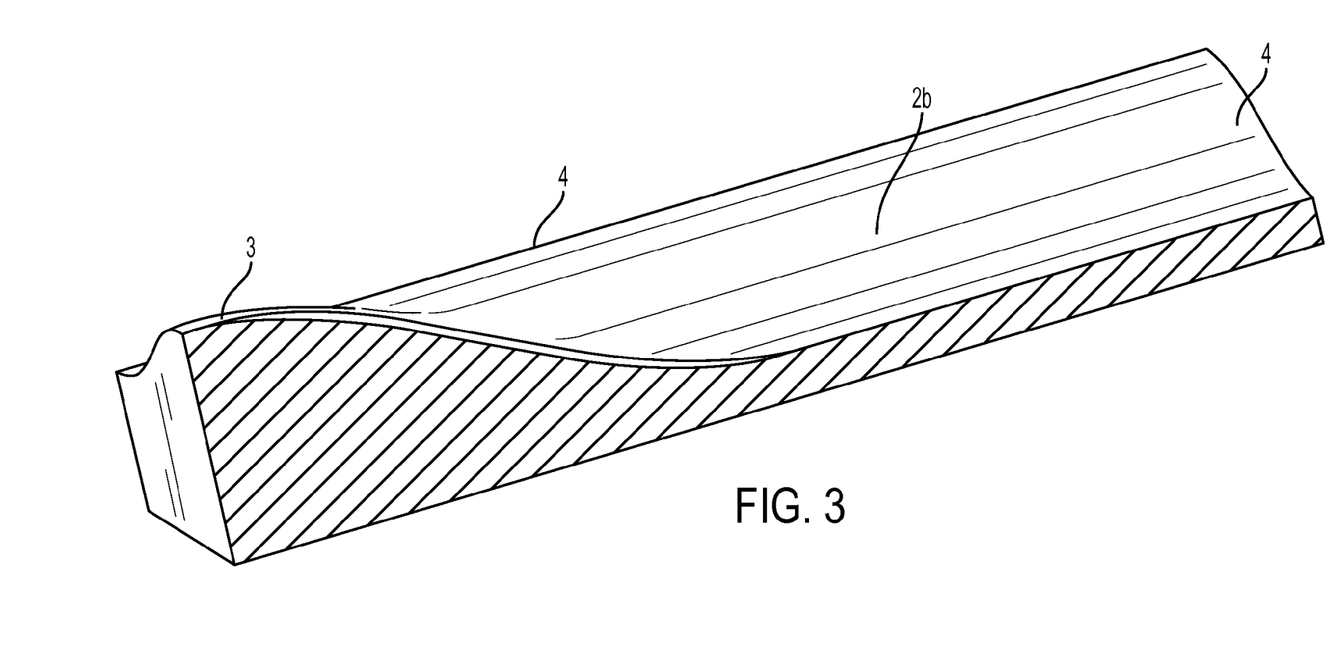
FIG. 3 shows a cut through a half of a rectangular separating membrane according to an embodiment of the invention.

FIG. 3 shows a cut through half a structure of the separating membrane of FIG. 1, in which parts of the transition zone 3 between the convex (left) and concave (right) bulging are shown. The separating membrane is shown in its entirety for the half structure. As can be seen from FIG. 3, the oil almost fills the entire cavity defined by the separating membrane, i.e. the remaining volume which is not filled with oil is non-zero. The remaining volume is non-zero in order for the bulging to be able to travel as a wave front across the separating membrane driven by pressure influence. This wave front propagation occurs continuously and dynamically.

Examples of pressure sensor assemblies in which the separating membrane according to the present invention may be used are WO2009/067016 and WO2008/150176, which are hereby incorporated by reference herein. The pressure sensor may have a shaft part which is introduced into an opening of a conduit or compartment, in which case a flange section fastens and seals the shaft part in the opening. The pressure of the process fluid is transferred to a pressure sensor element via the separating membrane and a pressure-transferring fluid. The separating membrane covers an opening in a body that leads in to a thin conduit leading into the sensor assembly. The sensor assembly may be located in a retracted position inside a sensor compartment of the flange part. In this case, the circumference of the opening is defined by the end of a block providing a base for the separating membrane. The separating membrane is fastened along the circumference of the end block. The conduit leading into the sensor assembly, together with the separating membrane and the opening, forms the closed volume as explained above. The separating membrane provides a separation between the process fluid to be measured, which is located on the outside of the separating membrane, and the pressure-transferring hydraulic fluid located behind the separating membrane. Behind the separating membrane an abutment surface (membrane seat) may be provided which is complementary to the separating membrane, and against which the separating membrane may be seated should the pressure difference become too large. This prevents the separating membrane against rupturing. The pipe holding the pressure-transferring fluid is arranged in the centre of the abutment surface. The sensor assembly may also be disposed in a sensor compartment behind the separating membrane, in which case the closed volume is defined by the separating membrane and the sensor compartment walls.

Figure 4:
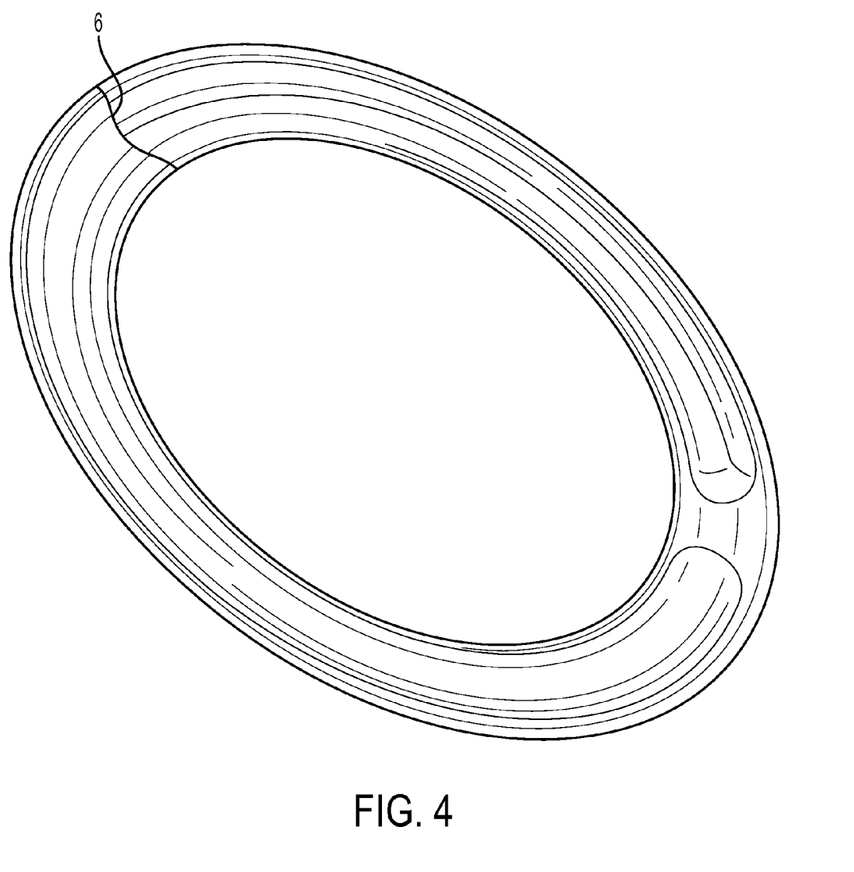
FIG. 4 shows a substantially annular (circular) separating membrane according to an embodiment of the invention, but fastening is not shown.

FIG. 4 shows a principle design of a separating membrane having an annular (circular) shape. The fastening of the membrane, however, is not shown. Also in this case, the ring-shaped membrane is formed by a metal foil suspended across an opening (not shown). The opening has a geometrical shape that is complementary to the outside geometrical shape of the separating membrane, and is hence also annular (circular). Like in the rectangular separating membrane embodiment, the opening leads into a volume filled with a pressure-transferring fluid. The centre of the ring of FIG. 4 is sealed; i.e. there is no communication between an inner volume and a process fluid on the outside in this region. In the suspended configuration, the membrane forms a border between the process fluid to be measured, which is located on the outside of the membrane, and the pressure-transferring fluid in the volume on the inside of the membrane. An annular separating membrane may be used inside a pipe, for example. The separating membrane could then be mounted in a section over the entire periphery of the inner wall. In this case, the opening would be defined by the inner wall of the pipe in this section. A thin pipe/conduit leading into a pressure measuring assembly is provided in the pipe wall in this section.

The foil in FIG. 4 is suspended across the opening in such a manner that the resulting membrane assumes an annular shape with bulges having convex and concave sections in the same manner as shown in FIG. 3, for example. The foil is welded to the opening in a similar manner as shown in FIG. 2 for the rectangular configuration. In the ring-shaped embodiment shown in FIG. 4, the separating membrane has been welded down over its entire radius at least at one location in order to form an end surface 6. The transition between the convex and concave sections of the membrane, as explained above, is provided by a transition zone. Consequently, the transition zone is able to move as a wave dynamically and continuously in response to pressure changes, forward and backwards around the circumference of the ring between the end surfaces for the movement. In both directions the end surfaces are defined by the same weld 6. The travel direction of the wave front of this wave will then be parallel with the tangent of the periphery of the separating membrane.

In some cases it may also be advantageous to define several end surfaces for the ring by welding down the ring over its entire radius at several locations along the annulus. The end surfaces should be positioned in such a manner that the transition zones of the separating membrane do not contact each other.

The separating membrane may have several embodiments. In the embodiment shown in FIGS. 1-3, the separating membrane is rectangular, whereas in FIG. 4, it is annular. It is also possible, however, to form the separating membrane with other geometrical shapes. Both the manufacture and operation of both the rectangular configuration and the annular configuration of the separating membrane will be explained in more detail below. Pressure sensors using the separating membrane configuration of the invention may also be provided with a membrane seat behind the separating membrane. This membrane seat will have a shape that is fully adapted to the arcuate shape of the separating membrane. With separating membranes formed based on a concave arcuate shape of the foil, the separating membrane may be seated against the membrane seat in the presence of high pressures and thus be able to withstand large pressure loads without rupturing.

As an example, a separating membrane may be mounted on the inside of pipes to serve as a pressure transfer mechanism for taking pressure measurements at defined points within the pipe. The separating membrane may be mounted around the entire circumference of the inner pipe wall. In this case the pipe wall may have a pit/recess towards which the membrane may be seated and that functions as a seat for the separating membrane. The edges of the separating membrane are welded against the pipe wall so that it is located over the recess and covers it with a bulging shape as explained earlier. A thin pipe/conduit leading to a pressure measurement assembly is provided in the pipe wall somewhere inside this recess. A pressure-transferring fluid is squeezed in behind the membrane so that it almost fills the conduit and the space behind the separating membrane, i.e. the remaining volume is nonzero. Such a solution may be used for measuring pressure in process facilities both below and above water level and onshore, as well as in other pipe installations in which it is desired to measure the pressure in situ. Pipe sections having such separating membranes provided on the inside may be prefabricated and positioned at desired locations along a pipeline in which it is desired to measure the pressure. An associated pressure measuring assembly having a pressure-transferring pipe/conduit may be connected to the pipe section after installation.

The examples in the specification use hydraulic oil as the transfer medium. However, as a transfer medium may be used any fluid which does not react with the system, and which does not boil or freeze within the applicable range of operating temperatures for the sensor.

Manufacture and Operation

The separating membrane may be made from a metal foil. The thickness may be as small as $1/100$ mm. The foil is made without discontinuities so that its thickness is uniform throughout the entire foil.

The foil is made with such dimensions that the outer opening of the conduit or cavity leading to the pressure sensor has smaller dimensions than those of the foil. As the dimensions of the foil are larger than those of the opening, the foil is given a slightly bulging shape (natural bend) before the foil is fastened across the opening, so that it is possible to arrange the edges of the foil onto and along the edges of the opening.

The thin foil is then arranged onto the outer opening and fixedly welded along the edge of the opening. The foil is pressed down at a number of places, so that a mechanical stress or mechanical stresses is/are induced in the material. These mechanical stresses define one or more zones of elastic compression in the foil. The number of compression zones depends on whether the separating membrane has one or more transition zones or is concave throughout its entire length. The elastic compression zones of the foil create areas having curved shapes (convex/concave). The separation/transition between such elastic compression zones in the foil are called transition zones. Hence, a transition zone represents a transition between areas/sections of the resulting separating membrane having oppositely facing arcs.

The depressing of the foil must not result in plastic deformation of the foil, and the depressing force applied is therefore less than the force resulting in plastic deformation of the foil. In practice, the depressing force should be less than half of the force required for causing permanent plastic deformations. The depressing of the metal foil may be accomplished, for example, through the use of a clamping tool. Welding of the foil may be accomplished by way of laser.

The order of bending, welding, and depressing varies with the geometrical shape and the number of transition zones in the final separating membrane.

In the case of a cavity having a rectangular opening and a corresponding rectangular separating membrane as shown in FIGS. 1-3, the order of the steps for welding and depressing will vary depending on the number of transition zones in the final membrane.

In an embodiment of a rectangular separating membrane having one transition zone the manufacturing process may be as follows:

1) Bending the foil to a convex natural bend having a ridge parallel to the long side of the foil.

2) Welding the long sides of the foil onto the long side edges of the opening.

3) Welding the short side of the foil naturally located on the short side of the opening having a convex shape.

4) Depressing the other short side and welding this short side to the other short side edge of the opening.

5) Introducing/squeezing in hydraulic oil or another suitable transfer medium beneath the separating membrane so that the volume between the separating membrane and membrane seat is at least half full.

The resulting separating membrane has oppositely facing arcs, i.e. convex and concave sections having a transition zone therebetween. This embodiment of the separating membrane having one transition zone may in overpressure situations be seated against the membrane seat. This results in a robust construction that may be designed for resisting pressures up to 3000 bar.

In the case of a rectangular separating membrane having two or more transition zones, the manufacturing process may be as follows:

1) Bending the foil to a concave natural bend having a valley parallel to the long side of the foil.

2) Welding all four sides, both the long sides and short sides, onto the edges of the opening. This causes the foil to be suspended between the edges, hence maintaining the natural concave bend from step 1.

3) Introducing fluid into the cavity beneath the separating membrane until a region of the separating membrane "flips over" to a second stable state, resulting in a separating membrane having a concave/convex/concave or convex/concave/convex shape.

In case of overpressure, the separating membrane having two or more transition zones will not be protected in the same manner as the embodiment having one transition zone, as it cannot be formed with an overpressure abutment. Such a membrane, however, is easier to manufacture.

In another embodiment, the separating membrane may be circular.

The manufacturing process for a circular separating membrane may be as follows:

1) Bending the foil to a convex natural bend, with the longitudinal direction of the ridge of the natural bend being parallel to a tangent of the circumference of the foil.

2) Placing the foil having the naturally curved convex shape onto the edges of the opening. Then, the inner and outer edges (circumference) of the foil will be welded onto to the inner and outer edges (circumference) of the opening.

3) Welding a radial weld in order to form an end surface in the circular separating membrane in a position in which the foil, in the convex shape, is naturally seated against the corresponding radial convex shape of the membrane seat.

4) Welding a radial weld to form a second end surface in the circular separating membrane in a second position in which the foil, in the concave shape, is naturally seated against the corresponding radial concave shape of the membrane seat. Before the other end surface is welded, the foil is depressed to a convex shape in the welding area.

5) Introducing hydraulic oil beneath the resulting separating membrane until the volume between the separating membrane and membrane seat is at least half full.

It is possible to place the convex and concave welds (forming the end surfaces) close to each other. The resulting circular separating membrane has one transition zone. The end surfaces, as described above, forms end surfaces for the circular wave motion of the separating membrane, as explained above.

It is also possible to form a circular separating membrane having two transition zones. The manufacture of such a separating membrane may follow the same principles as the rectangular embodiment with two transition zones.

1) Bending the foil to a concave natural arc having a recess parallel to a tangent of the circumference of the foil.

2) Welding the inner and outer side edges, i.e. both the inner and outer radii, onto the respective inner and outer side edges (inner and outer radii) of the opening. This causes the foil to be clamped between the inner and outer radii, consequently maintaining the natural concave bend from step 1.

3) Introducing fluid into the cavity beneath the separating membrane until a region of the separating membrane "flips" to a second stable configuration, so as to provide a separating membrane having a concave/convex/concave or convex/concave/convex shape. In most embodiments, at least half the cavity between the separating membrane and membrane seat will be filled with fluid before the separating membrane "flips" to the final shape.

The separating membrane may be made with one or more transition zones. With an uneven number of transition zones, the end surfaces of the foil will be welded down in a concave and a convex arc shape. With an even number of transition zones, both end surfaces of the foil will be welded on the opening in a concave arcuate shape.

The process explained above induces material stresses in the foil. These stresses means that (potential) energy is stored in the material, as explained above. Hydraulic oil or another suitable transfer medium is squeezed/pressed into the volume behind the membrane. This will be performed differently depending on the initial shape of the foil (convex or concave). In the case of a foil having an initially concave arcuate shape, hydraulic fluid is introduced until a part of the foil "flips over" and enters a second stable state with a bi-stable zone with the ability to move as explained above. In the case of a foil having an initially convex arcuate shape, hydraulic fluid is introduced until the cavity beneath the foil is at least half full.

This configuration with a bi-stable zone will exist as long as the remaining volume beneath the separating membrane is non-zero. The size of the remaining volume is defined by the separating membrane material and the pressure and temperature conditions under which the separating membrane is to be used.

In the presence of pressure and temperature conditions resulting in a volume change of the oil, the transition zone of the membrane will move dynamically in a wave motion back and forth such that the concave and convex bulge will move along the membrane and thereby absorb a volume change of the fluid to be measured. This translation and volume change occurs without any loss of energy. The separating membrane will therefore transfer the pressure without any significant pressure drop even at high pressures and/or temperatures.

The dynamic wave motion of the separating membrane makes the sensor sensitive to extremely small pressure differences; up to 1 ppm of the pressure range even for high pressures and temperatures. Also, the separating membrane does not contribute to the measuring error even in the presence of large pressure and temperature differences. An example of typical temperature and pressure conditions, to which the pressure sensor comprising the separating membrane of the invention may be exposed in oil installations, is from $-70°$ C. to $+200°$ C., and from 0 to 2000 bar, respectively.

The separating membrane, as described above, may be made small and typically has a width in the order of 5-15 mm and a length of at least five times the width. It is advantageous if the length of the separating membrane is significantly larger than its width.

A number of other modifications and variants are also conceivable within the scope of the invention, as defined by the appended claims.

The invention claimed is:

1. A separating membrane for separating a process fluid and a pressure-transferring fluid,
the separating membrane being in the form of a thin foil covering an opening into a volume containing the pressure-transferring fluid,
the foil being fastened to edges of the opening,
wherein the separating membrane is fastened to the edges of the opening in such a manner that, in at least one region of an area thereof, the foil being elastically compressible and being elastically compressed such that the membrane exhibits a transition from a concave bulging to a convex bulging, and a location of the transition being movable by translation to different positions on the separating membrane whereby the separating membrane is able to absorb a volume change of the pressure-transferring fluid through a non-energy requiring translation movement of the transition.

2. The separating membrane according to claim 1, wherein the separating membrane is provided with a material stress.

3. The separating membrane according to claim 1 wherein the separating membrane and the opening have rectangular shapes, and the bulging has a ridge extending parallel to long sides of the rectangle, whereby a non-energy requiring translation of the transition is in a direction parallel to the long sides of the rectangle.

4. The separating membrane according to claim 1, wherein the separating membrane, in two regions of its area, exhibits a transition from a concave bulging to a convex bulging.

5. The separating membrane according to claim 1, wherein the separating membrane and the opening are shaped as a ring, and wherein the bulging has a ridge extending parallel with a tangent of a circumference of the ring, whereby a non-energy requiring translation of the transition is in a direction parallel with said tangent.

6. The separating membrane according to claim 1, wherein the pressure-transferring fluid is hydraulic oil.

7. A method for manufacturing a separating membrane, for separating between a process fluid and a pressure transferring fluid, in the form of a thin, elastically compressible foil covering an opening into a volume containing the pressure-transferring fluid, the foil being fastened to edges of the opening, the method comprising:

forming the separating membrane in a geometric shape substantially corresponding to a geometric shape of the opening, with the separating membrane being slightly larger than the opening so that when the separating membrane is fastened to the edges of the opening, a given arcuate shape results, and providing a material stress to the separating membrane via elastic compression for providing, in at least one section of the area of the separating membrane, a movable transition from a concave bulging to a convex bulging with the transition being movable by translation to different positions on the separating membrane, whereby the separating membrane is able to absorb a volume change of the pressure-transferring fluid through a non-energy requiring translation movement of the transition.

8. The method of claim 7, wherein the opening and the separating membrane have rectangular shapes, the method comprising:

bending the separating membrane to a convex arcuate shape having a longitudinal ridge parallel with long sides of the rectangle, fastening the long sides of the separating membrane to long edges of the opening, fastening the one short convex side of the separating membrane to a short edge of the opening having a corresponding convex arcuate shape, and depressing another short side of the separating membrane to a concave shape, and fastening said other short side of the separating membrane to a short side of the opening having a corresponding concave arcuate shape.

9. The method of claim 8, comprising introducing the pressure-transferring fluid into the volume beneath the separating membrane until the volume is at least half full.

10. The method of claim 7, wherein the opening and the separating membrane have rectangular shapes, the method comprising:

bending the separating membrane to a concave arcuate shape having a longitudinal valley parallel with long sides of the rectangle, and fastening long sides of the separating membrane to long edges of the opening and the short sides of the separating membrane to short edges of the opening, with the short edges of the opening being provided with a concave arcuate shape complementary to a concave arcuate shape of the concave short sides of the separating membrane.

11. The method of claim 10, comprising introducing the pressure-transferring fluid into the volume beneath the separating membrane until the separating membrane, in at least one region of its area, exhibits a transition from a concave to a convex bulging.

12. The method of claim 7, wherein the opening and the separating membrane have circular geometrical shapes, the method further comprising:

bending the separating membrane to a convex arcuate shape having a ridge parallel with a tangent of a circumference of the separating membrane, fastening an inner circular edge and an outer circular edge of the separating membrane to corresponding inner and outer circular edges of the opening, and radially fixing the separating membrane at a number of places at which the separating membrane, in a convex arcuate shape, rests naturally on a corresponding convex arcuate shape of the circular opening, to form a number of radial end surfaces for the separating membrane which restrict the non-energy requiring translation of the transition.

13. The method of claim 12, comprising introducing the pressure-transferring fluid into the volume beneath the separating membrane until the volume is at least half full.

14. The method of claim 7, wherein the opening and separating membrane have circular geometrical shapes, the method further comprising:

bending the separating membrane to a concave arcuate shape with a valley parallel to a tangent to a circumference of the separating membrane, and fastening an inner circular edge and an outer circular edge of the separating membrane to corresponding inner and outer circular edges of the opening.

15. The method of claim 14, comprising introducing the pressure-transferring fluid into the volume beneath the separating membrane until the separating membrane, in at least one region of its area, exhibits a transition from a concave to a convex bulging.

16. The method of claim 14, comprising radially fastening the separating membrane at the location at which the separating membrane in a concave arcuate shape rests naturally on a corresponding concave arcuate shape of the circular opening, to form a radial end surface for the separating membrane which restricts a non-energy requiring translation of the transition.

17. The method of claim 7, wherein providing a material stress includes performing pressing operations on the separating membrane.

18. The method of claim 17, wherein providing a material stress includes the use of a clamping tool.

19. The method of claim 7, wherein fastening is accomplished through welding.

20. The method of claim 7, comprising introducing the pressure-transferring medium in the form of a hydraulic oil in such an amount that a remaining volume of the volume containing the oil is non-zero.

21. A pressure sensor, comprising:
- a volume containing a pressure-transferring fluid for transferring a process pressure to be measured from a process fluid to a sensor for sensing the pressure,
- a separating membrane in the form of a thin foil covering an opening into the volume containing the pressure-transferring fluid, the foil being fastened to edges of the opening, the foil being elastically compressible, wherein
- the separating membrane is fastened to the edges of the opening in such a manner that, in at least one section of the area thereof, the foil being elastically compressible and being elastically compressed such that the membrane exhibits a transition from a concave bulging to a convex bulging, a location of the transition being movable by translation to different positions on the separating membrane whereby the membrane is able to accommodate a volume change of the pressure-transferring fluid through a non-energy requiring translation of the transition.

22. The pressure sensor of claim 21, wherein the pressure-transferring fluid is hydraulic oil.

23. The pressure sensor of claim 21, wherein the separating membrane is provided with a material stress.

\* \* \* \* \*